(12) United States Patent
Ko et al.

(10) Patent No.: US 11,335,920 B2
(45) Date of Patent: May 17, 2022

(54) MEMBRANE ELECTRODE ASSEMBLY FOR FUEL CELLS AND MANUFACTURING METHOD THEREOF

(71) Applicants: Hyundai Motor Company, Seoul (KR); Kia Motors Corporation, Seoul (KR)

(72) Inventors: Jae Jun Ko, Gyeonggi-do (KR); In Yu Park, Seoul (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 206 days.

(21) Appl. No.: 16/692,658

(22) Filed: Nov. 22, 2019

(65) Prior Publication Data

US 2020/0212457 A1  Jul. 2, 2020

(30) Foreign Application Priority Data

Dec. 28, 2018 (KR) .................. 10-2018-0172636

(51) Int. Cl.
  *H01M 8/0284* (2016.01)
  *H01M 8/0286* (2016.01)
  *H01M 8/1004* (2016.01)

(52) U.S. Cl.
  CPC ....... *H01M 8/0284* (2013.01); *H01M 8/0286* (2013.01); *H01M 8/1004* (2013.01); *H01M 2250/20* (2013.01)

(58) Field of Classification Search
  None
  See application file for complete search history.

(56) References Cited

U.S. PATENT DOCUMENTS

| | | | |
|---|---|---|---|
| 2010/0209811 A1* | 8/2010 | Barnwell | H01M 8/1007 429/483 |
| 2014/0127608 A1* | 5/2014 | Sakamoto | C08L 81/04 429/482 |
| 2014/0234749 A1* | 8/2014 | Tanaka | H01M 8/0273 429/481 |
| 2020/0287230 A1* | 9/2020 | Lee | C08J 9/42 |

* cited by examiner

*Primary Examiner* — Alix E Eggerding
(74) *Attorney, Agent, or Firm* — Mintz Levin Cohn Ferris Glovksy and Popeo, P.C.; Peter F. Corless

(57) ABSTRACT

Disclosed are a membrane electrode assembly with a sub-gasket and a manufacturing method thereof. The membrane electrode assembly includes an electrolyte membrane, the sub-gasket formed in an edge region of the electrolyte membrane to surround a central region of the electrolyte membrane, and an adhesive layer formed between the electrolyte membrane and the sub-gasket and including an adhesive material and an antioxidant. The electrolyte membrane is formed to have a flat surface in a first direction, the sub-gasket extends in the first direction and a second direction vertical to the first direction, and the antioxidant includes a metal salt hydrate.

18 Claims, 8 Drawing Sheets

MEMBRANE ELECTRODE ASSEMBLY FOR FUEL CELLS AND MANUFACTURING METHOD THEREOF

CROSS-REFERENCE TO RELATED APPLICATION

This application claims under 35 U.S.C. § 119(a) the benefit of priority to Korean Patent Application No. 10-2018-0172636 filed on Dec. 28, 2018, the entire contents of which are incorporated herein by reference.

TECHNICAL FIELD

The present invention relates to a membrane electrode assembly including a sub-gasket for fuel cells and a manufacturing method thereof.

BACKGROUND

Reaction to generate electricity of a fuel cell happens in a membrane electrode assembly (MEA) including a perfluorinated sulfonic acid ionomer-based electrolyte membrane, and electrodes, such as an anode and a cathode. In order to enhance durability of the fuel cell, various technologies to mitigate chemical degradation of the electrolyte membrane have been proposed and, for example, a method of adding various kinds of antioxidants to the electrolyte membrane has been proposed. As these antioxidants, a primary antioxidant functioning as a radical scavenger or quencher and a secondary antioxidant functioning as a hydrogen peroxide decomposer may be used independently or mixed.

In the related art, an electrolyte membrane to which an excessive amount of an antioxidant is added has increased chemical durability, but a sulfonic acid group in the electrolyte membrane is combined with the cationic antioxidant and decreases hydrophilic properties, thereby deteriorating proton conductivity and performance of a fuel cell. Therefore, appropriate use of antioxidants in consideration of performance and durability may be required. Further, in the related art, a metal oxide introduced into an electrolyte membrane is dissolved during a manufacturing process or driving of the fuel cell and is thus ionized, or an antioxidant introduced into the electrolyte membrane in the form of ions easily migrate under driving environments of the fuel cell, leaks to the outside of the cell and may thus decrease durability of the electrolyte membrane of the fuel cell in the long run. For this purpose, development of a functional antioxidant which may prevent dissolution and migration thereof or a cell which may compensate for loss of an antioxidant included in an electrolyte membrane may be in demand.

SUMMARY

In one preferred aspect, provided are a membrane electrode assembly including an adhesive layer and a method of manufacturing the same. For instance, an antioxidant may be added to the membrane electrode assembly to stabilize peroxides generated at the position of the adhesive layer.

In other preferred aspect, provided are an electrolyte membrane including a metal salt hydrate which may exist in the form of ions under an aqueous solution condition and a method of manufacturing the same, such that chemical durability of the membrane electrode assembly may be enhanced.

In other preferred aspect, provided is a method of manufacturing an electrolyte membrane by forming a cerium ion migration control area and by compressing, for example, thermocompressing, at least a part of an adhesive layer and to restrict a migration speed of cerium cations or a supply position of the cerium cations therethrough.

In an aspect, the present invention provides a membrane electrode assembly with a sub-gasket. The membrane electrode assembly may include an electrolyte membrane, a sub-gasket formed in an edge region of the electrolyte membrane to surround a central region of the electrolyte membrane, and an adhesive layer formed between the electrolyte membrane and the sub-gasket and including an adhesive material and an antioxidant. The electrolyte membrane may be formed to have a flat surface in a first direction, the sub-gasket extends in the first direction and a second direction that is vertical to the first direction. The antioxidant may include a metal salt hydrate.

The term "flat surface" as used herein refers to a surficial area of an object having a two dimensional surface area, which may not include a substantial curvature (e.g., more than 0.5, 1, 2, 3, 4, or 5 degrees curvature) on its face and have substantially greater area compared to a cross-sectional area along a thickness direction of the object. In certain embodiments, the flat surface may not include sub-structures, e.g., holes, engraved structures, protrusion, or embossed structures.

The sub-gasket may protrude in the second direction.

The metal salt hydrate may suitably include one or more selected from the group consisting of a cerium salt hydrate, a cesium salt hydrate and a manganese salt hydrate.

The cerium salt hydrate may be ionized into trivalent cerium cations ($Ce^{3+}$) and a salt under an aqueous solution condition.

The cerium salt hydrate may suitably include one or more selected from the group consisting of cerium nitrate hexahydrate ($Ce(NO_3)_3$ $6H_2O$), cerium carbonate hydrate ($Ce(CO_3)_3$ $H_2O$), cerium chloride heptahydrate ($CeCl_3$ $7H_2O$) and cerium sulfate octahydrate ($Ce_2(SO_4)_3$ $8H_2O$).

The adhesive layer may suitably include an amount of about 5,000 ppm to 200,000 ppm of the antioxidant per dry weight of the adhesive layer.

The adhesive material may suitably include i) one or more selected from the group consisting of polyurethane, polyvinyl acetate, ethylene vinyl acetate, poly vinyl alcohol, poly vinyl ethylene, resorcinol-based resins, poly acrylic and poly vinyl ether, and ii) a curing agent. The curing agent may suitably include one or more selected from the group consisting of peroxide-based, amine-based, aromatic-based, polyimide-based and isocyanate-based compounds.

The sub-gasket may suitably include one or more selected from the group consisting of polyethylene terephthalate (PET), polyethylene naphthalate (PEN), polyimide (PI) and polypropylene (PP).

The adhesive layer may further include a cerium ion migration control area configured to surround at least a part of the central region of the electrolyte membrane.

The cerium ion migration control area may suitably include a cerium ion migration preventive surface facing the central region of the electrolyte membrane, and one or more openings formed in the cerium ion migration preventive surface.

A region of the electrolyte membrane adjacent to the openings may have a greater concentration of cerium cations than a region of the electrolyte membrane adjacent to the cerium ion migration preventive surface.

In another aspect, the present invention provides a manufacturing method of a membrane electrode assembly with a sub-gasket. The method may include preparing an adhesive dispersion liquid including an adhesive material and an antioxidant including a metal salt hydrate; forming an adhesive layer on the sub-gasket by coating a first surface of the sub-gasket with the adhesive dispersion liquid; and bonding the adhesive layer to an edge region of an electrolyte membrane to dispose the sub-gasket so as to surround a central region of the electrolyte membrane.

The bonding the adhesive layer to the edge region of the electrolyte membrane may be performed at a temperature of about 50° C. to 150° C.

The bonding the adhesive layer to the edge region of the electrolyte membrane may be performed at a pressure of about 0.5 MPa to 10.0 MPa.

In the preparing the adhesive dispersion liquid, the metal salt hydrate may include a cerium salt hydrate.

The manufacturing method may further include a cerium ion migration control area by compressing, for example, thermocompressing, on at least a part of the adhesive layer configured to surround at least a part of the central region of the electrolyte membrane.

The term "thermocompressing" as used herein refers to a process of applying heat and pressure, for example, by compressing a specific area at a predetermined pressure as applying heat or increasing the temperature at that area. In certain embodiments, the thermocompressing may be performed by increasing the temperature to about 100° C., to about 200° C., to about 250° C., or to 300° C.

The forming the cerium ion migration control area may include forming a cerium ion migration preventive surface on the adhesive layer in the central region of the electrolyte membrane, and forming one or more openings in at least some regions of the cerium ion migration preventive surface so as to cause cerium cations to migrate therethrough.

The forming the cerium ion migration control area may be performed at a temperature of about 100° C. to 300° C.

The forming the cerium ion migration control area may be performed at a pressure of about 3.2 MPa to 38.4 MPa.

The manufacturing method may further include forming the electrolyte membrane, prior to the bonding the adhesive layer to the edge region of the electrolyte membrane. In certain embodiments, the forming the electrolyte membrane may include preparing an admixture including an ionomer, a solvent and the antioxidant, coating a release film with the admixture, and forming the electrolyte membrane by performing drying and heat treatment of the coated admixture.

Still further provided is a fuel cell that includes the membrane electrode assembly as described herein.

Also provided is a vehicle that includes the fuel cell described herein.

Other aspects and preferred embodiments of the invention are discussed infra.

BRIEF DESCRIPTION OF THE DRAWINGS

In order that the disclosure may be well understood, there will now be described various forms thereof, given by way of example, reference being made to the accompanying drawings, in which.

Figure 1:
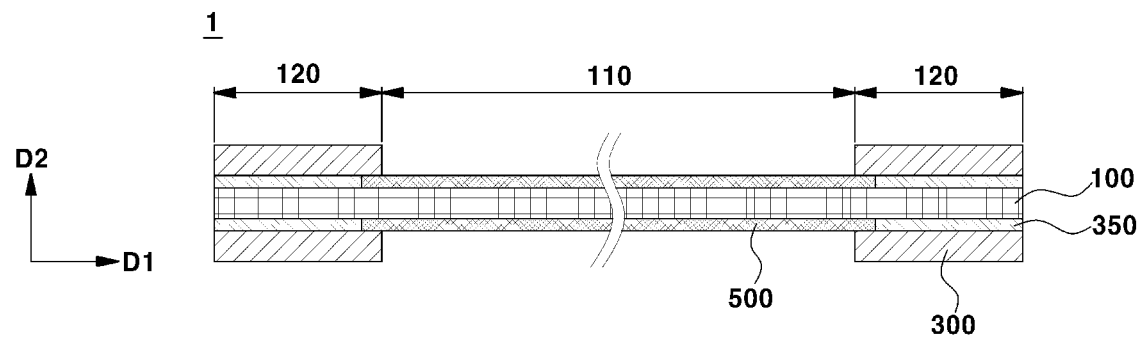
FIGS. 1 to 3 are side views of exemplary membrane electrode assemblies according to several exemplary embodiments of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. In the following description of the embodiments, the same elements are denoted by the same reference numerals even though they are depicted in different drawings.

Unless stated as having other definitions, all terms (including technical and scientific terms) used in the following description of the embodiments will be interpreted as having meanings which those skilled in the art can understand. Also, terms which are defined in generally used dictionaries are not to be interpreted ideally or excessively unless clearly defined as having special meanings.

Also, terms used in the description of the embodiments serve merely to describe the embodiments and do not limit the present invention. In the description of the embodiments, singular expressions may encompass plural expressions, unless they have clearly different contextual meanings. In the following description of the embodiments, terms, such as "comprising", "including", "having", etc., will be interpreted as indicating the presence of characteristics, numbers, steps, operations, elements and/or parts stated in the description or combinations thereof, and do not exclude the presence of one or more other characteristics, numbers, steps, operations, elements and/or parts, combinations thereof or possibility of adding the same. In addition, the term "and/or" will be interpreted as including each of stated items and all combinations of one or more thereof.

Further, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. For example, "about" can be understood as within 10%, 9%, 8%, 7%, 6%, 5%, 4%, 3%, 2%, 1%, 0.5%, 0.1%, 0.05%, or 0.01% of the stated value.

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Hereinafter, the present invention will be described in detail with reference to the accompanying drawings.

Figure 2:
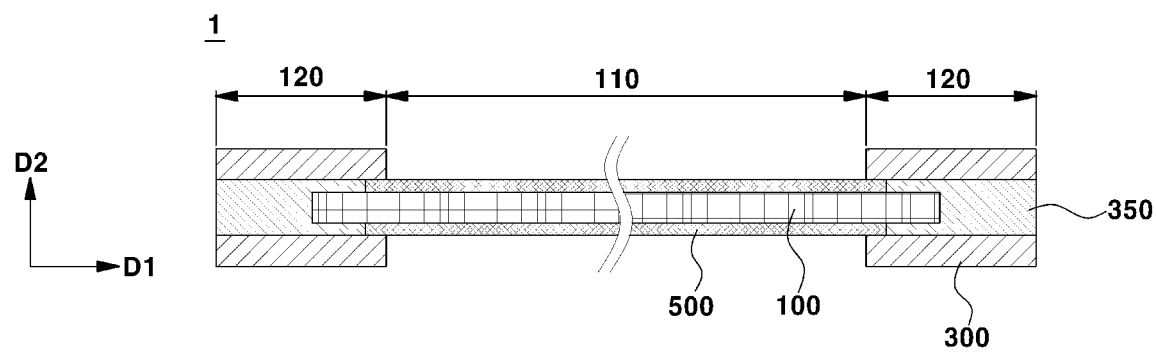
Figure 3:
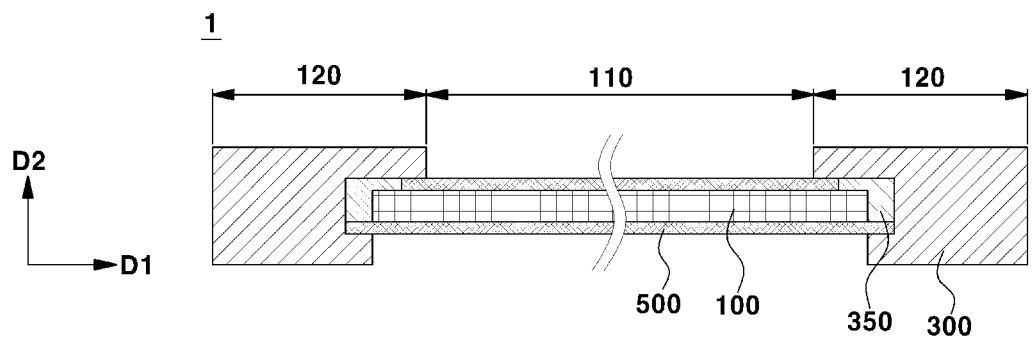

FIGS. 1 to 3 are side views of exemplary membrane electrode assemblies according to several exemplary embodiments of the present invention.

In FIG. 1, a membrane electrode assembly 1 may include an electrolyte membrane 100, a sub-gasket 300 formed in an edge region of the electrolyte membrane 100 to surround a central region of the electrolyte membrane 100, and an adhesive layer 350 formed between the electrolyte membrane 100 and the sub-gasket 300 and including an adhesive material and an antioxidant. Further, the electrolyte membrane 100 may be formed to have a substantially flat surface in a first direction D1, and the sub-gasket 300 may extend in the first direction D1 and a second direction D2 vertical to the first direction D1. That is, the sub-gasket 300 may surround both ends (i.e., the edge) of the electrolyte membrane 100, and the adhesive layer 350 including the antioxidant (for example, a cerium salt hydrate) may be located between the sub-gasket 300 and the electrolyte membrane 100.

The electrolyte membrane (or a membrane) 100 may generate hydrogen ions by electrochemical reaction in an electrode layer 500 (particularly, a hydrogen electrode) to migrate, and simultaneously serves to cut off reaction gas. The electrolyte membrane 100 may include, for example, one or more selected from the group consisting of fluorinated and hydrocarbon ionomers. Particularly, the ionomer may include a perfluorinated sulfonic acid ionomer, without being limited thereto. Further, a reinforced layer may be placed between ionomers and thus reinforce mechanical properties of the electrolyte membrane 100.

The sub-gasket 300 may be attached to the membrane electrode assembly 1 for fuel cells to provide structural stability to the membrane electrode assembly 1. The sub-gasket 300 may have an increased thickness and rigidity compared to a conventional sub-gasket. Since the sub-gasket 300 may cause increase in the length of a stack of a fuel cell including many repeated parts, a polymer film having a decreased thickness, for example, tens to hundreds of μm may be used as the sub-gasket 300.

The sub-gasket 300 may include, for example, one or more selected from the group consisting of polyethylene terephthalate (PET), polyethylene naphthalate (PEN), polyimide (PI) and polypropylene (PP). For example, the outer surface of the sub-gasket 300 may be coated with these polymers. The sub-gasket 300 may be distinguished from a gasket which is generally used for stabilization of airtightness of the fuel cell.

In order to bond the sub-gasket 300 and the electrolyte membrane 100, the adhesive layer 350 including the adhesive material and the antioxidant may be formed between the sub-gasket 300 and the electrolyte membrane 100. Exemplary adhesive materials to include in the adhesive layer may be, for example, one or more of polyurethane, polyvinyl acetate, ethylene vinyl acetate, poly vinyl alcohol, poly vinyl ethylene, resorcinol-based resins, poly acrylic and poly vinyl ether.

Particularly, the antioxidant included in the adhesive layer 350 may include a metal salt hydrate. In the related art, fuel cells generally include metal oxide-based and modified metal oxide-based antioxidants. To the contrast, in the present invention, an antioxidant may include a metal salt hydrate.

Further, the metal salt hydrate included in the adhesive layer 350 according to an exemplary embodiment the present invention may include one or more selected from the group consisting of a cerium salt hydrate, a cesium salt hydrate and a manganese salt hydrate. Particularly, when the metal salt hydrate includes cerium (Ce) and manganese (Mn), the adhesive layer 350 may exhibit excellent performance.

In detail, the cerium salt hydrate included in the adhesive layer 350 according to an exemplary embodiment of the present invention may be ionized into trivalent cerium cations ($Ce^{3+}$) and a salt under an aqueous solution condition (i.e., under the condition that cerium salt hydrate comes into contact water). Therefore, by adding a water-based adhesive to a region of the electrolyte membrane 100, which is bonded to the sub-gasket 300 by the adhesive layer 350 (i.e., an inactive area 120), the cerium cations may migrate to a region of the electrolyte membrane 100, which is not bonded to the sub-gasket 300 (i.e., an active area 110). For example, the cerium salt hydrate included in the antioxidant may be dissolved and ionized in an aqueous solution, and the cerium cations may migrate from the adhesive layer 350 to the electrolyte membrane 100 and then from the electrolyte membrane 100 in the inactive area 120 to the electrolyte membrane 100 in the active area 110. Such migration of the cerium cations may be influenced by a cerium content.

As the cerium cations migrate as such, chemical durability of the membrane electrode assembly 1 to which the water-based adhesive layer 350 and the sub-gasket 300 are bonded may be increased. For example, when a cell or a stack including the membrane electrode assembly 1 is driven, cerium cations included in the water-based adhesive layer 350 may migrate to the active area 110 through the inactive area 120 of the electrolyte membrane 100 due to a concentration difference of the cerium cations. That is, by adding the cerium salt hydrate to the adhesive layer 350 contacting the inactive area 120 of the electrolyte membrane 100, an amount of cerium lost in the active area 110 during driving of the fuel cell may be maintained (or supplemented) or compensated for and, thus, chemical durability of the membrane electrode assembly 1 may be enhanced.

The cerium salt hydrate may include, for example, one or more selected from the group consisting of cerium nitrate hexahydrate ($Ce(NO_3)_3$ $6H_2O$), cerium carbonate hydrate ($Ce(CO_3)_3$ $H_2O$), cerium chloride heptahydrate ($CeCl_3$ $7H_2O$) and cerium sulfate octahydrate ($Ce_2(SO_4)_3$ $8H_2O$). However, in addition to the above-described cerium salt hydrates, other metal salt hydrates which are easily ionized under the aqueous solution condition and have antioxidant ability are not excluded. That is, the antioxidant including any metal salt hydrate, which may migrate from the inactive area 120 to the active area 110 (for example, a central region of the electrolyte membrane 100) to enhance chemical durability of the membrane electrode assembly 1, may be used.

Further, an amount of about 5,000 ppm to 200,000 ppm of the antioxidant per dry weight of the adhesive layer 350 may be included in the adhesive layer 350 according to an exemplary embodiment of the present invention. Particularly, an amount of about 10,000 ppm to 50,000 ppm of the antioxidant may be included in the adhesive layer 350.

The adhesive material included in the adhesive layer 350 according to an exemplary embodiment of the present invention may include, for example, one or more selected from the group consisting of polyurethane, polyvinyl acetate, ethylene vinyl acetate, poly vinyl alcohol, poly vinyl ethylene, resorcinol-based resins, poly acrylic and poly vinyl ether. The adhesive material of the adhesive layer 350 may include various chemical materials which may increase adhesive force of the sub-gasket 300. Further, such an adhesive material may be not only applied to the adhesive layer 350 formed on the sub-gasket 300 but also used to increase adhesive force between the electrolyte membrane 100 and the gasket for airtightness.

The adhesive layer 350 according to an exemplary embodiment of the present invention may further include a curing agent. The curing agent may include, for example, one or more selected from the group consisting of peroxide-based, amine-based, aromatic-based, polyimide-based and isocyanate-based compounds, without being limited thereto. That is, various chemical substances which may shorten a curing time may be used as the curing agent.

As shown in FIG. 1, an electrode layer 500 (for example, including platinum (Pt) and a carbon (C) support) may be disposed on each of both surfaces (e.g., first surface and second surface of an electrolyte membrane 100, which may be opposite to each other in the first direction D1. For instance, the first surface and the second surface may be opposite to each other in the first direction D1. By bonding a sub-gasket 300 to the outer surface of the electrode layer 500 using an adhesive layer 350 (particularly, the water-based adhesive layer), a highly durable membrane electrode assembly 1 with the sub-gasket 300 attached thereto may be manufactured.

Further, FIGS. 2 and 3 illustrate various structures of membrane electrode assemblies according to exemplary embodiments of the present invention. For convenience of description, elements which are different from those of the membrane electrode assembly 1 shown in FIG. 1 will be mainly described.

As shown in FIG. 2, sub-gaskets 300 and an electrolyte membrane 100 may extend in the first direction D1 and be disposed in parallel. That is, the electrolyte membrane 100 and the sub-gaskets 300 may be located in parallel, and a broad bonding region between the electrolyte membrane 100 and an adhesive layer 350 may be formed.

As described above, an inactive area 120 of the electrolyte membrane 100 bonded to the sub-gasket 300 by the adhesive layer 350 may be located at both ends of the electrolyte membrane 100. Electrochemical reaction of a fuel cell may be generated in an active area 110 of the electrolyte membrane 100 (for example, the central region of the electrolyte membrane 100) which is not bonded to the sub-gasket 300.

As shown in FIG. 2, the adhesive layer 350 may be disposed so as to surround both ends of the electrolyte membrane 100. That is, the adhesive layer 350 may be formed to be in contact with the upper and lower surfaces and a first side surface of the electrolyte membrane 100, thus bonding the sub-gaskets 300 and the electrolyte membrane 100.

The electrolyte membrane 100 may have a decreased thickness, for example, tens of μm and thus it may be difficult to handle the electrolyte membrane 100. In order to solve such a defect, a polymer film having greater rigidity than the electrolyte membrane 100 may be used to reinforce the electrolyte membrane 100 (for example, a region outside the active area 110).

Thereafter, as shown in FIG. 3, a sub-gasket 300 may protrude in the second direction D2, and thereby the sub-gasket 300 may be disposed to surround the side surfaces of the electrolyte membrane 100. Further, the adhesive layer 350 may be formed to be in contact with one side surface and the upper or lower surface of the electrolyte membrane 100, thus bonding the sub-gasket 300 and the electrolyte membrane 100. That is, the sub-gasket 300 may cover both edges of the adhesive layer 350 and the electrolyte membrane 100 and, thus, a bonding region between the electrolyte membrane 100 and the adhesive layer 250 may be narrower than those of FIGS. 1 and 2.

Particularly, the membrane electrode assembly 1 shown in FIG. 3 is distinguished from the cell structures shown in FIGS. 1 and 2 in that a gasket for airtightness may be directly bonded to a region for the sub-gasket 300 shown in FIG. 3 by injection molding (i.e., a region for the sub-gasket 300 and the adhesive layer 350 may be replaced by the gasket for airtightness), or bonded to the adhesive layer 350 to form a bonding structure.

A bonding structure formed among the sub-gasket 300, the adhesive layer 350 including the antioxidant and the electrolyte membrane 100 is not limited to the cross-sectional shapes shown in FIGS. 1 to 3, and may have various cross-sectional shapes according to cell structures.

Figure 4:
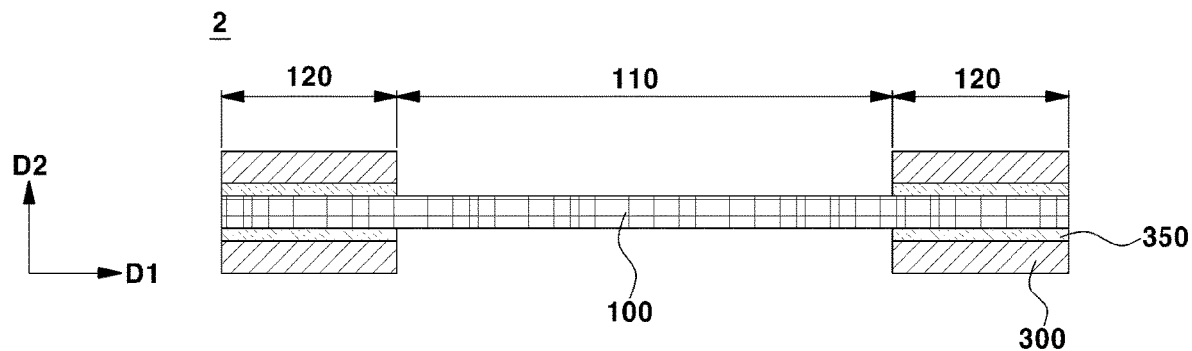
FIG. 4 is a side view showing an exemplary structure in which electrode layers are removed from the membrane electrode assemblies according to an embodiment of the present invention.
Figure 5:
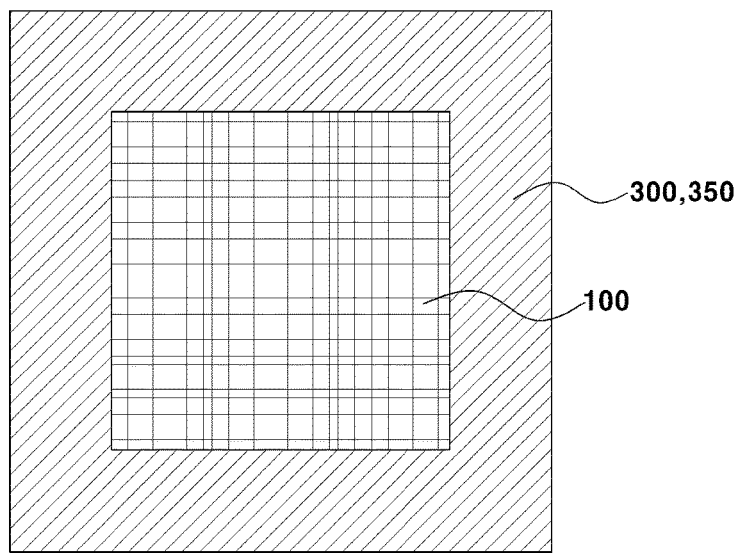
FIG. 5 is a plan view of FIG. 4.

Thereafter, FIGS. 4 and 5 illustrate a structure 2 obtained by removing the electrode layers 500 (in FIG. 1) from a membrane electrode assembly according to several embodiments of the present invention.

As exemplarily shown in FIG. 4, by implementing the structure 2 including the electrolyte membrane 100, the sub-gaskets 300 and the adhesive layers 350 by removing the electrode layers 500 and verifying characteristics of the structure 2, mobility of cerium included in the adhesive layer 350 located in the inactive area 120 to the electrolyte membrane 100 may be confirmed.

The present invention is not limited to the structure 2 shown in FIG. 4, and structures obtained by removing the electrode layers 500 from the membrane electrode assemblies 1 of FIGS. 1 to 3 may be implemented and characteristics thereof may be verified.

Figure 6:
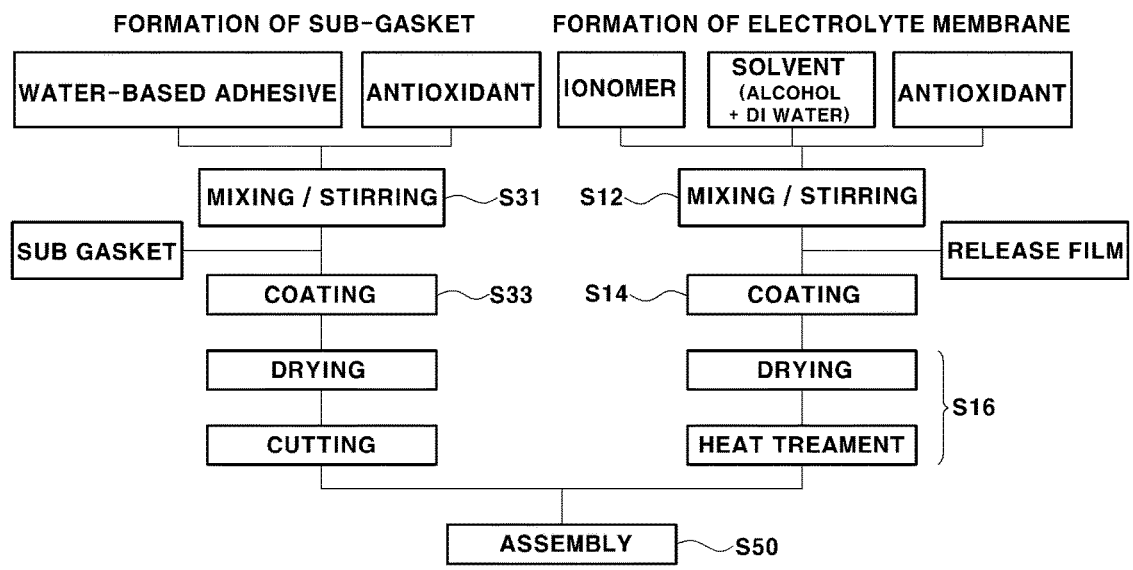
FIG. 6 is a flowchart representing an exemplary manufacturing method of an exemplary membrane electrode assembly according to an exemplary of the present invention.

FIG. 6 is a flowchart representing a manufacturing method of a membrane electrode assembly with a sub-gasket according to exemplary embodiments of the present invention.

As shown in FIG. 6, a manufacturing method of a membrane electrode assembly with a sub-gasket may include forming the sub-gasket having an adhesive layer attached thereto, the adhesive layer including an antioxidant and an adhesive material (S31 and S33), forming an electrolyte membrane (S12, S14 and S16), and bonding the sub-gasket and the electrolyte membrane (S50).

The manufacturing method according to exemplary embodiments of the present invention may include preparing an adhesive dispersion liquid from an adhesive material and an antioxidant including a metal salt hydrate (S31), forming the adhesive layer on the sub-gasket by coating a first surface of the sub-gasket with the adhesive dispersion liquid (S33), and bonding the adhesive layer to an edge region of the electrolyte membrane to dispose the sub-gasket so as to surround a central region of the electrolyte membrane (S50).

In order to bond the sub-gasket to the membrane electrode assembly, the forming the adhesive layer using the prepared adhesive liquid solution (S33) may be required. Further, as described above, by adding a cerium salt hydrate to the adhesive layer coming into contact with the inactive area 110 (with reference to FIG. 1) of the electrolyte membrane, the amount of cerium loss in the active area 120 (with reference to FIG. 1) during driving of the fuel cell may be compensated for or supplemented by cerium cations in the inactive area coming from the adhesive layer and, thus, chemical durability of the membrane electrode assembly may be enhanced.

When a metal oxide group which is conventionally used as an antioxidant is added to the prepared adhesive dispersion liquid (S31), the metal oxide group may not be soluble and thus does not exhibit the desired effect. Therefore, a cerium salt hydrate (for example, cerium nitrate hexahydrate ($Ce(NO_3)_3 \cdot 6H_2O$) or cerium carbonate hydrate ($Ce(CO_3)_3 \cdot H_2O$), which is easily dissolved in water and may thus exist in the form of ions under an aqueous solution condition, may be used as the antioxidant to enhance chemical durability of the electrolyte membrane.

Further, the bonding the adhesive layer to the electrolyte membrane (S50) may be performed, for example, through plate-type thermocompression or roll-type thermocompression, thus manufacturing the membrane electrode assembly with the sub-gasket. Further, in the bonding the adhesive layer to the electrolyte membrane (S50), for example, two sub-gaskets in which an active area is formed by punching may be provided in a set and the sub-gaskets may be respectively attached to both surfaces (i.e., the front and rear surfaces, or the first surface and the second surface which are opposing to each other) of the electrolyte membrane. For example, the sub-gaskets, the inner areas of which are cut off or punched so as to correspond to the active areas of electrodes, may be bonded to the membrane electrode assembly so that the sub-gaskets may be located at the edges of the electrodes outside the active areas.

The bonding the adhesive layer to the electrolyte membrane (S50) may be performed at a temperature of about 50° C. to 150° C. Further, in the bonding the adhesive layer to the electrolyte membrane (S50), the membrane electrode assembly with the sub-gaskets bonded thereto may be manufactured, for example, by performing thermocompression for a few seconds or tens of seconds (for example, 20 seconds) according to predetermined temperatures and pressures.

Preferably, the bonding the adhesive layer to the electrolyte membrane (S50) may be performed at a pressure of about 0.5 MPa to 10.0 MPa. Particularly, when the bonding pressure is about 1.0 MPa to 6.4 MPa, the sub-gaskets and the membrane electrode assembly may be firmly bonded.

Migration of cerium cations from the inactive area 110 to the active area 120 of the electrolyte membrane may be influenced not only by a cerium content but also by a bonding temperature, a bonding pressure and a bonding area in the bonding the adhesive layer to the electrolyte membrane (S50).

As shown in FIG. 6, the manufacturing method may further include the forming the electrolyte membrane, prior to the bonding the adhesive layer to the electrolyte membrane (S50). The forming the electrolyte membrane may include preparing an admixture including an ionomer, a solvent and an antioxidant (S12), coating a release film with the admixture (S14) and forming the electrolyte membrane by performing drying and heat treatment of the coated admixture (S16).

Further, the manufacturing method of the membrane electrode assembly for fuel cells may further include forming electrode layers (e.g., an anode layer and a cathode layer) on both surfaces of the electrolyte membrane. These electrode layers may be formed by directly coating both surfaces of the electrolyte membrane with materials for the electrode layers, or by primarily coating release papers with materials for the electrode layers and then transferring the materials to the electrolyte membrane.

Figure 7:
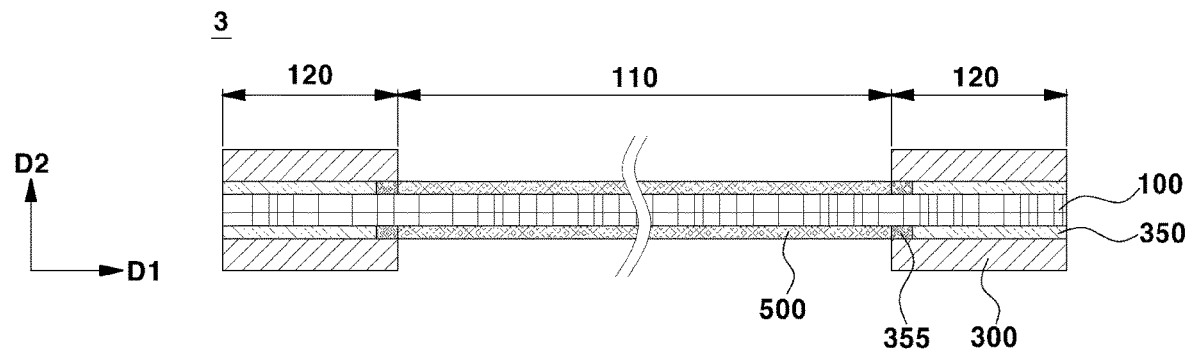
FIG. 7 is a plan view of an exemplary membrane electrode assembly including an exemplary cerium ion migration control area according to an exemplary embodiment of the present invention.
Figure 8:
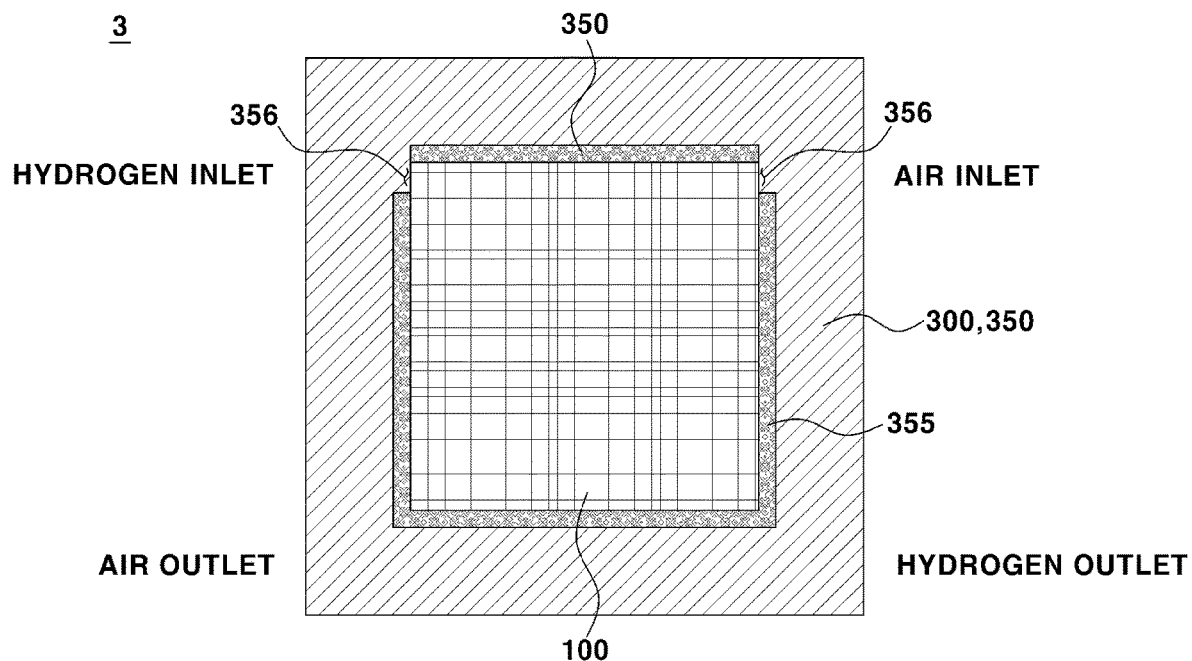
FIGS. 8 to 12 are plan views of exemplary membrane electrode assemblies including an exemplary cerium ion migration control area according to several exemplary embodiments of the present invention.

FIGS. 7 and 8 are views illustrating a membrane electrode assembly including a cerium ion migration control area according to an exemplary embodiment of the present invention. For convenience of description, a detailed description of some parts in this embodiment, which are substantially the same as those in the embodiments shown in FIGS. 1 to 6, will be omitted because it is considered to be unnecessary.

As shown in FIG. 7, an adhesive layer 350 may include a cerium ion migration control area 355 to surround at least a part of a central region of an electrolyte membrane 100. Such a cerium ion migration control area 355 may control migration of cerium cations from an inactive area 120 to an active area 110 of the electrolyte membrane 100.

In order to achieve excellent durability of the electrolyte membrane 100, the cerium ion migration control area 355 may be located, for example, outside the active area 110 so as to control a migration speed of cerium cations to the inactive area 120. Further, the cerium ion migration control area 355 may reinforce a region in which cerium is rapidly lost and thus consequently enhance chemical durability of the electrolyte membrane 100.

Thereafter, as shown in FIG. 8, the cerium ion migration control area 355 may include a cerium ion migration preventive surface facing the central region of the electrolyte membrane 100 and one or more openings 356 formed in the cerium ion migration preventive surface.

That is, the cerium ion migration preventive surface may refer to the cerium ion migration control area 355 which blocks or limits migration of cerium cations from the inactive area 120 to the active area 110. Therefore, the cerium ion migration control area 355 may locally increase a migration amount of cerium cations. In general, in driving of a fuel cell requiring a durability life of thousands of hours, the cerium ion migration control area 355 may control a degree of migration of cerium cations and thus enhance long-term durability of the electrolyte membrane 100.

A region of the electrolyte membrane 100, which is adjacent to the openings 356, may have a greater concentration of cerium cations than a region of the electrolyte membrane 100, which is adjacent to the cerium ion migration preventive surface. That is, through the openings 356 included in the cerium ion migration control area 355, a greater amount of cerium cations may migrate on the cerium ion migration preventive surface such that a larger amount of cerium cations may migrate from the inactive area 120 to the active area 110 through the openings 356.

Such openings 356 may be formed around, for example, a reaction gas inlet. Since degradation of the electrolyte membrane 100 may become severe at the reaction gas inlet during driving of the fuel cell, the reaction gas inlet may be more easily dried than the central region of the electrolyte membrane 100 or a reaction gas outlet and may thus easily be chemically or physically degraded. The reason for this is that a greater number of radicals may be generated due to a large penetration amount of gas caused by increase in a pressure difference between hydrogen and air flow paths. Because a specific region of the electrolyte membrane 100 needs to maintain a higher concentration of cerium so as to stabilize the radicals in order to mitigate such degradation, a high concentration of cerium may be maintained at the openings 356 of the cerium ion migration control area 355.

Hereinafter, FIGS. 9 to 12 are plan views of membrane electrode assembles including a cerium ion migration control area according to several exemplary embodiments of the present invention.

A degradation part may be varied according to vehicle system driving conditions or cell designs and, thus, cerium ion migration control areas 355 having various shapes are required according to analysis results. For example, the migration speed and supply position of cerium cations on the electrolyte membrane 10 may be restricted and controlled not only by presence and absence of the cerium ion migration control area 355 but also by various structures of the cerium ion migration control area 355 (i.e., whether or not the cerium ion migration preventive surface and the openings 356 are formed).

Figure 9:
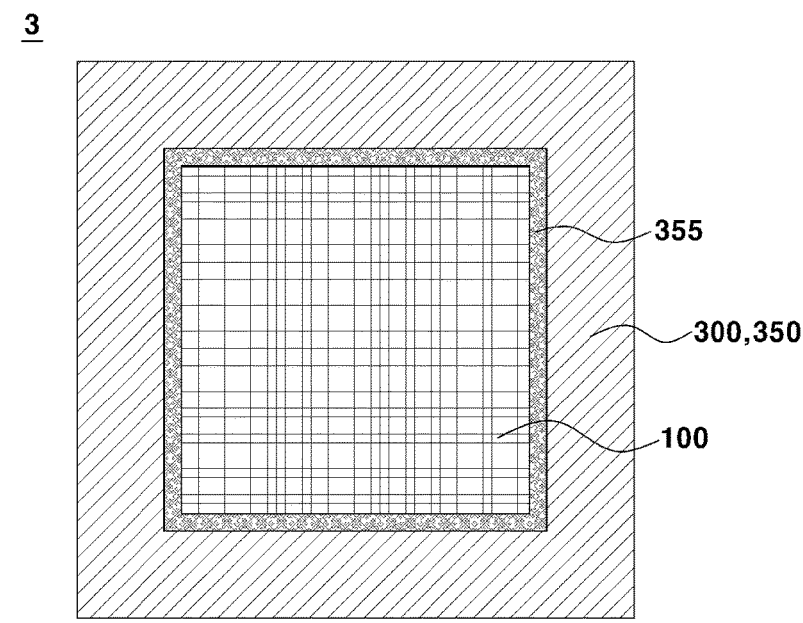

As shown in FIG. 9, a cerium ion migration area 355 without formation of an opening 856 (with reference to FIG. 8) may be formed to surround the entirety of the border of an active area 110 of an electrolyte membrane 100, and thus, restrict a migration speed of cerium cations to the active area 110.

Figure 10:
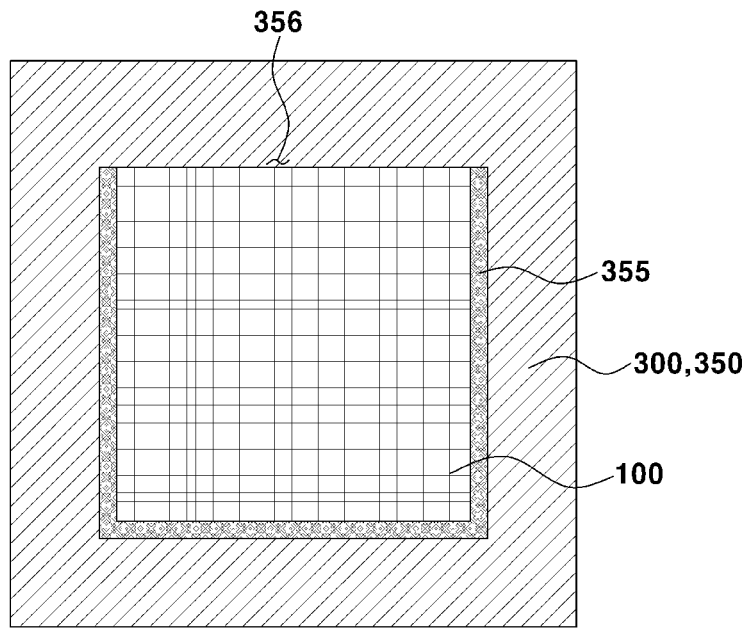

Further, as shown in FIG. 10, a cerium ion migration control area 355 may be formed in a line-type shape. The cerium ion migration control area 355 may include a cerium ion migration preventive surface and one opening 356.

Figure 11:
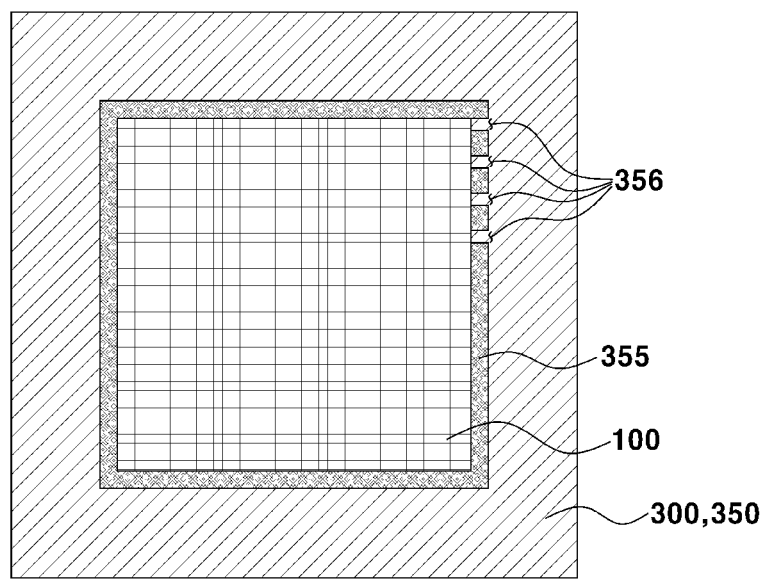

Further, as shown in FIG. 11, a cerium ion migration control area 355 may be formed in a dot-type shape. The cerium ion migration control area 355 may include a cerium ion migration preventive surface and four openings 356.

Therefore, as shown in FIGS. 10 and 11, formation of the cerium ion migration control area 355 may decrease an average migration amount of cerium cations, and formation of the openings 356 may increase a local migration amount of cerium cations at a region adjacent to the openings 356. As shown in FIG. 11, the cerium ion migration control area 355 formed in the dot-type shape rather than the line-type shape may control a migration amount of cerium cations. Therefore, since a distribution difference of cerium cations may be more increased in a cell structure having a broader active area, the openings 356 may be formed at a part of the cerium ion migration control area 355 adjacent to a region of the electrolyte membrane 100 which is deficient in cerium.

Figure 12:
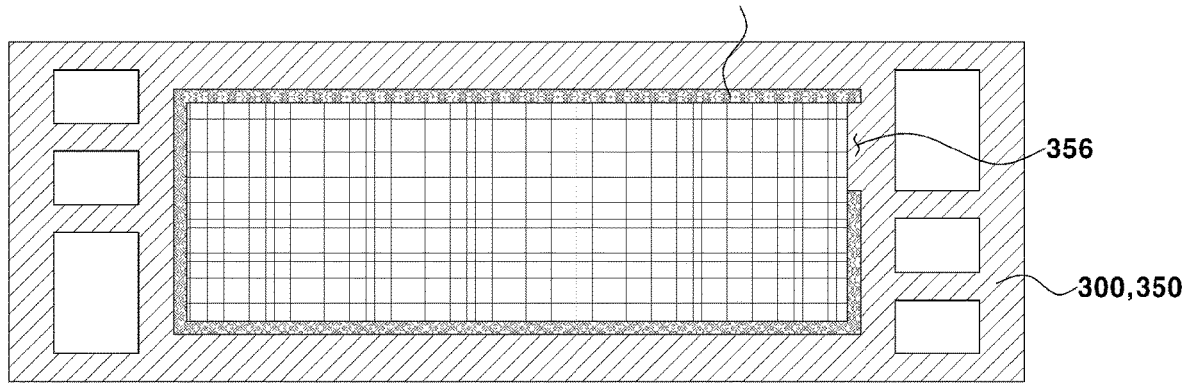

Thereafter, FIG. 12 illustrates an exemplary cell structure which is applicable to vehicles. As shown in FIG. 12, a cerium ion migration control area 355 may be formed on a serpentine flow path-type cell. For instance, in order to increase a migration amount of cerium at an air supply part in which degradation may be most seriously generated, an opening 356 may be formed in the cerium ion migration control area 355.

The cerium ion migration control area 355 is not limited to the shapes shown in FIGS. 9 to 12, and may have various shapes and widths in consideration of cell driving conditions or the like. For example, the cerium ion migration control area 355 may have various shapes, such as a line-type shape, a dotted line-type shape, a double line-type shape, a wave-type shape, etc.

The manufacturing method according to several exemplary embodiments of the present invention may include forming the above-described cerium ion migration control area 355. The cerium ion migration control area 355 may be formed by compressing, or particularly, thermocompressing at least a part of the adhesive layer surrounding at least a part of the central region of the electrolyte membrane. As such, by heat-treating a part of the adhesive layer, reduction in flatness of the inactive area of the electrolyte membrane and damage to airtightness of the fuel cell, which may be generated when the overall area of the sub-gasket is bonded to the electrolyte membrane at a high temperature, may be prevented.

For example, the forming the cerium ion migration control area 355 may be performed after the bonding the adhesive layer to the electrolyte membrane (S50 in FIG. 6). For instance, the heat treatment to form the cerium ion migration control area 355 may be performed after primary heat treatment to bond the sub-gasket to the electrolyte membrane (S50). Otherwise, the cerium ion migration control area 355 may be formed by differentiating bonding pressures and bonding temperatures applied to regions of the adhesive layer in heat treatment to bond the sub-gasket to the electrolyte membrane (S50). Thereby, durability enhancement effects due to migration of cerium cations may be maximized.

The forming the cerium ion migration control area 355 may be performed, for example, at a temperature of about 100° C. to 300° C. Particularly, the forming the cerium ion migration control area 355 may be performed at a temperature of about 150° C. to 250° C.

Further, the forming the cerium ion migration control area 355 may be performed, for example, at a pressure of about 3.2 MPa to 38.4 MPa. Particularly, the forming the cerium ion migration control area 355 may be performed at a pressure of about 6.4 MPa to 48.4 MPa.

EXAMPLE

Hereinafter, the present invention will be described in more detail through the following examples and comparative examples. The following examples serve merely to exemplarily describe the present invention and are not intended to limit the scope of the invention.

Manufacturing Example 1: Manufacture of Membrane Electrode Assembly with Sub-Gasket 1-1) Electrolyte Membrane Including Cerium In manufacturing example 1, an electrolyte membrane including a fluorinated ionomer having an equivalent weight (EW) of 700 to 800, deionized (DI) water and an organic solvent was manufactured to have a thickness of 20 μm to 25 μm on a Teflon film using a bar coater, and 1,000 ppm of cerium nitrate hexahydrate ($Ce(NO_3)_3 \cdot 6H_2O$) per weight of the ionomer was added to the electrolyte membrane. The manufactured electrolyte membrane underwent a drying process at a temperature of 80° C. for 2 hours and a heat treatment process at a temperature of 160° C. for 5 minutes, and thereby, an unreinforced electrolyte membrane was manufactured.

1-2) Sub-Gasket

As sub-gaskets applied to the manufacturing example, in order to increase ease in handling of the membrane electrode assembly and reinforce the edge of an active area which is the most vulnerable to expansion and contraction, two sub-gaskets were placed on both surfaces of the electrolyte membrane outside the active area and bonded to the surfaces of the electrolyte membrane. A polyethylene naphthalate film was used as the sub-gaskets.

1-3) Adhesive Layer

An adhesive layer is used to achieve stable bonding between the electrolyte membrane and the sub-gasket or between the electrolyte membrane and a gasket for airtightness. In manufacturing example 1, the sub-gasket coated with an adhesive layer was manufactured by coating the surface of the sub-gasket with a vinyl acetate-based adhesive layer, which is diluted with DI water at a ratio of 30%, using a bar coater and then evaporating moisture from the adhesive layer located on the surface of the sub-gasket at a temperature of 80° C. using an oven. Further, in order to cure the adhesive layer, 1% or less of an isocyanate-based curing agent per dry weight of the adhesive layer was used.

1-4) Antioxidant

In manufacturing example 1, among metal salt hydrates, effects of antioxidants including cerium, i.e., cerium nitrate hexahydrate ($Ce(NO_3)_3 \cdot 6H_2O$), cerium carbonate hydrate ($Ce(CO_3)_3 \cdot H_2O$), according to various contents from 10,000 ppm to 500,000 ppm per dry weight of the adhesive layer were verified.

Manufacturing Example 2: Addition of Cerium Ion Migration Control Area

In manufacturing example 2, a membrane electrode assembly having the same composition and structure as those of the membrane electrode assembly in manufacturing example 1 was used, and a cerium ion migration control area was formed by bonding an electrolyte membrane and sub-gaskets through plate-type thermocompression at a temperature of 100° C. and then varying temperature (e.g., from 150° C. to 250° C.) and pressure conditions. An opening was formed at a region of the cerium ion migration control area adjacent to a reaction gas supply part by applying no pressure thereto.

In more detail, the electrolyte membrane with a sub-gasket manufactured to have the shape of FIG. 8 was used, the cerium ion migration control area having a width of 4 mm was located at an outer part of the electrolyte membrane adjacent to the active area, and no bonding was performed at an air inlet so as to form an opening having a width of 1 cm (i.e., so as not to form the cerium ion migration control area) at the air inlet. Therefore, the total area of the cerium ion migration control area was 3.76 cm$^2$.

Test Conditions

Figure 13:
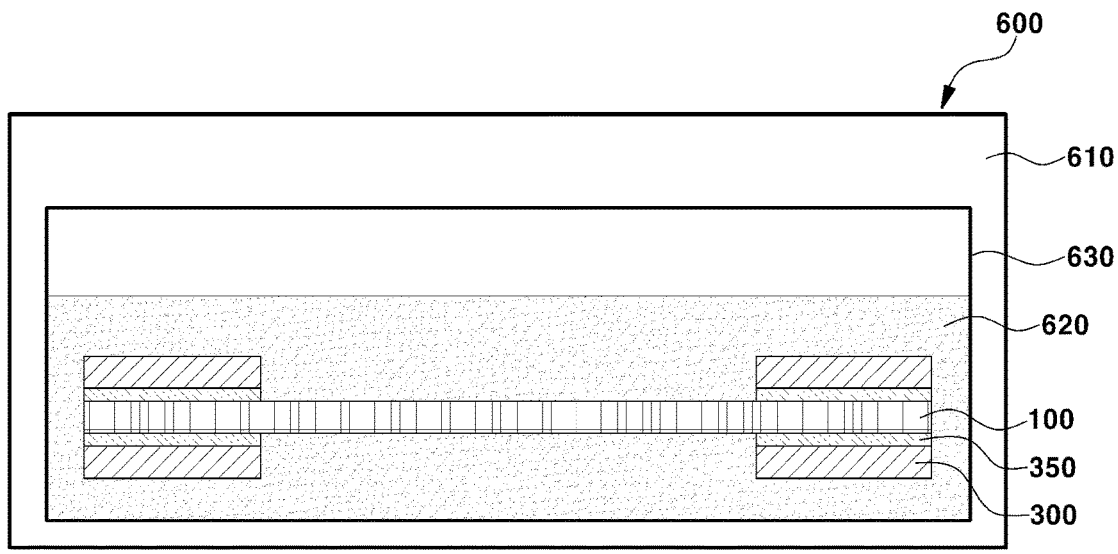
FIG. 13 is a schematic diagram of an exemplary test apparatus for evaluation example 1.

FIG. 13 illustrates a test apparatus 600 to perform a cerium ion mobility test of a membrane electrode assembly 3 including sub-gaskets 300. Cerium contents in the sub-gaskets 300 in a single element state prior to bonding to an electrolyte membrane 100 were measured, the mobility test was performed to select the sub-gaskets 300 having a cerium content coinciding with an actually input amount of cerium within an error range of 2%, and X-ray fluorescence spectrometry (XRF) measurement was carried out before and after the cerium ion mobility test after bonding of the sub-gaskets 300 to the electrolyte membrane 100.

As shown in FIG. 13, in order to perform the cerium ion mobility test, the electrolyte member 100 with the sub-gaskets 300 was put into a vial 630 filled with DI water 620, disposed within a constant temperature chamber 610.

Evaluation Example 1

Figure 14:
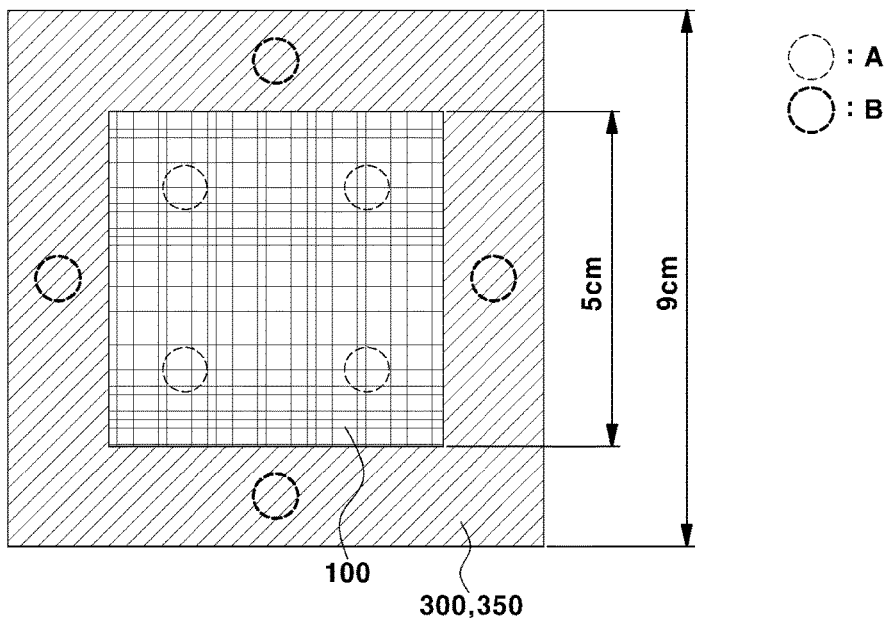
FIG. 14 is a plan view illustrating an exemplary membrane electrode assembly manufactured according to evaluation example 1.

FIG. 14 is a plan view of the membrane electrode assembly 1 manufactured by manufacturing example 1 so as to be evaluated under the above-described test conditions. A sample of the electrolyte membrane 100 including an active area having a width of 5 cm and thus having a total area of 25 cm$^2$ was manufactured. Further, in the manufactured sample, the total width of the electrolyte membrane 100 including an inactive area including the sub-gasket 300 and the antioxidant was 9 cm. Further, regions A in FIG. 14 represent X-ray fluorescence spectrometry (XRF) measurement positions of the electrolyte membrane 100, and regions B represent X-ray measurement positions of the sub-gasket 300.

1-1) Feasibility of Increase in Cerium Content and Appearance Characteristic According to Kinds of Antioxidants Table 1 below represents results indicating increments of cerium in the active area and appearance characteristics of the sub-gasket according to whether or not the adhesive layer applied to bond the electrolyte membrane and the sub-gasket includes an antioxidant, and kinds of antioxidants. Two kinds of antioxidants, i.e., cerium oxide and cerium nitrate hexahydrate, were used. As cerium oxide, a product having a particle size of 50 nm, manufactured by Aldrich Corp., was used. As cerium nitrate hexahydrate, a product having a purity of 99.99% and a molecular weight of 434.22, manufactured by Aldrich Corp., was used. The contents of the respective antioxidants applied to the adhesive layers were fixed to 20,000 ppm per dry weight of the adhesive layer, and curing of the adhesive layers was performed in a constant temperature chamber at a temperature of 80° C. for 2 hours.

TABLE 1

| Classification | Antioxidant in adhesive layer | | Bonding of electrolyte membrane and sub-gasket | | Increment of cerium in active area (after 120 hr.) | | | Appearance of bonding part of sub-gasket |
|---|---|---|---|---|---|---|---|---|
| | Kind | Content (ppm/dry weight of adhesive layer) | Bonding Temp. (° C.) | Bonding pressure (MPa) | Cerium amount (before) (μg/cm2) | Cerium amount (after) (μg/cm2) | Increment (%) | |
| Comparative example 1 | None | — | 100 | 3.2 | 2.8 | 2.8 | 0 | Good |
| Comparative example 2 | CeO2, 50 nm | 20,000 | | | 2.7 | 2.8 | 4 | Good |
| Example 1-1 | Ce(NO3)3 6H2O | 20,000 | | | 2.7 | 4.8 | 78 | Good |

As results of cerium ion mobility comparison, it was confirmed that, when the sample of the electrolyte membrane included cerium oxide, cerium scarcely migrated from the inactive area to the active area of the electrolyte membrane within 120 hours and when the sample of the electrolyte membrane included cerium nitrate hexahydrate, a cerium content in the active area of the electrolyte membrane was increased by 78%. Thereby, it was understood that cerium nitrate hexahydrate included in the adhesive layer bonded to the electrolyte membrane may be ionized into cerium cations, the cerium cations migrate from the inactive area to the active area of the electrolyte membrane due to a concentration difference and thus the cerium content in the active area of the electrolyte membrane may be increased. In addition, bonding of the sub-gaskets to the electrolyte membranes in all cases, i.e., comparative examples 1 and 2 and example 1-1, may be efficiently carried out and thus appearances of the bonding parts of the sub-gaskets to the electrolyte membranes in comparative examples 1 and 2 and example 1-1 were good.

1-2) Feasibility of Increase in Cerium Content and Appearance Characteristic According to Contents of Antioxidants Table 2 below represents results indicating increments of cerium in the active area and appearance characteristics of the sub-gasket according to contents of antioxidants in the adhesive layer.

As the content of the antioxidant in the adhesive layer was increased, the amount of cerium migrating to the active area was increased. There was no great difference according to application of cerium nitrate hexahydrate ($Ce(NO_3)_3$ $6H_2O$) and cerium carbonate hydrate ($Ce(CO_3)_3$ $H_2O$), and both materials caused increase in cerium in the active area. However, as the content of cerium nitrate hexahydrate ($Ce(NO_3)_3$ $6H_2O$) included in the adhesive layer was increased, generation of blisters in the sub-gasket was increased and thus a defect of bonding between the electrolyte membrane and the sub-gasket occurred. The reason for this may be that the antioxidant included in the adhesive layer lowers adhesiveness between the electrolyte membrane and the sub-gasket, water from the outside enters a defective part and causes blisters, and thus an increment of cerium was increased. Therefore, the content of the antioxidant in the examples may not exceed 50,000 ppm per dry weight of the adhesive layer.

1-3) Bonding Conditions Between Electrolyte Membrane and Sub-Gasket

Table 3 below represents results indicating increments of cerium in the active area and appearance characteristics of the sub-gasket according to bonding conditions between the electrolyte membrane and the sub-gasket.

TABLE 2

| Classification | Antioxidant in adhesive layer | | Bonding of electrolyte membrane and sub-gasket | | Increment of cerium in active area (after 120 hr.) | | | Appearance of bonding part of sub-gasket |
|---|---|---|---|---|---|---|---|---|
| | Kind | Content (ppm/dry weight of adhesive layer) | Bonding Temp. (° C.) | Bonding pressure (MPa) | Cerium amount (before) (μg/cm²) | Cerium amount (after) (μg/cm²) | Increment (%) | |
| Example 1-1 | $Ce(NO_3)_3$ $6H_2O$ | 20,000 | 100 | 3.2 | 2.7 | 4.8 | 78 | Good |
| Example 1-2 | $Ce(NO_3)_3$ $6H_2O$ | 10,000 | | | 2.4 | 2.9 | 20 | Good |
| Example 1-3 | $Ce(NO_3)_3$ $6H_2O$ | 50,000 | | | 2.6 | 13.2 | 128 | Good |
| Example 1-4 | $Ce(NO_3)_3$ $6H_2O$ | 200,000 | | | 2.7 | 20.1 | 644 | Poor (blister) |
| Example 1-5 | $Ce(NO_3)_3$ $6H_2O$ | 500,000 | | | 2.5 | 47.6 | 1,804 | Poor (blister) |
| Example 2-1 | $Ce(CO_3)_3$ $H_2O$ | 20,000 | | | 2.4 | 5.0 | 108 | Good |

TABLE 3

| Classification | Antioxidant in adhesive layer | | Bonding of electrolyte membrane and sub-gasket | | Increment of cerium in active area (after 120 hr.) | | | Appearance of bonding part of sub-gasket |
|---|---|---|---|---|---|---|---|---|
| | Kind | Content (ppm/dry weight of adhesive layer) | Bonding Temp. (° C.) | Bonding pressure (MPa) | Cerium amount (before) (μg/cm$^2$) | Cerium amount (after) (μg/cm$^2$) | Increment (%) | |
| Example 1-1 | Ce(NO$_3$)$_3$ 6H$_2$O | 20,000 | 100 | 3.2 | 2.7 | 4.8 | 78 | Good |
| Example 3-1 | | | 100 | 0.3 | 2.4 | 16.8 | 600 | Poor (blister) |
| Example 3-2 | | | 100 | 1.0 | 2.7 | 5.1 | 89 | Good |
| Example 3-3 | | | 100 | 6.4 | 2.7 | 3.8 | 41 | Good |
| Example 3-4 | | | 50 | 3.2 | 2.5 | 5.2 | 108 | Good |
| Example 3-5 | | | 150 | 3.2 | 2.6 | 3.1 | 19 | Good (browning) |

The evaluation results of example 1-1 and examples 3-1 to 3-3 according to bonding pressures show that, when the bonding pressure was of or less than 0.3 MPa, bonding was not efficiently carried out, water from the outside easily entered a defective part and caused blisters of the sub-gasket, cerium easily migrated, a migration amount of cerium was increased and thus an increment of cerium in the active area was increased. When the bonding pressure was greater than the predetermined range, blisters did not occur and bonding was efficiently carried out and thus the migration amount of cerium was decreased. However, an excessively high bonding pressure may damage the cell and thus proper pressure limitation may be required. Consequently, it may be understood that a proper bonding pressure applied to the sub-gasket may be of about 1.0 MPa to 6.0 MPa. Further, the evaluation results of example 1-1 and examples 3-4 and 3-5 according to bonding temperatures show that, when the bonding temperature was 50° C. of greater, transfer was efficiently carried out and a migration amount of cerium was increased in inverse proportion to temperature. However, when the bonding temperature was raised to 150° C. of greater, browning locally occurred. Since, when bonding was carried out at a high temperature or room temperature, bonding force may be decreased or the electrolyte membrane may be damaged, a proper bonding temperature may be required.

As the above results of evaluation example 1, a proper bonding temperature may be of about 50° C. to 150° C. However, such conditions are related to bonding properties of the electrolyte membrane, the sub-gasket and the adhesive layer, and thus different conditions may be applied according to specifications and bonding methods. For example, as compared to a planar hot press, a roll-to-roll continuous process may achieve bonding under higher temperature and pressure conditions within a short time. Therefore, conditions, such as the optimum bonding temperature and pressure conditions, may be varied according to respective processes.

In addition, a contact area between the electrolyte membrane and the adhesive layer and a length of an interface between the inactive area and the active area may be important factors considered to change migration characteristics of cerium. The contact area used in the test examples and evaluation examples of the present invention occupied about 70% of a total area, i.e., 81 cm$^2$. When such a percentage is reduced, the migration speed of cerium may be proportionally decreased, the above-described proper bonding conditions may be varied according to cell structures and properties of the respective single elements.

Figure 15:
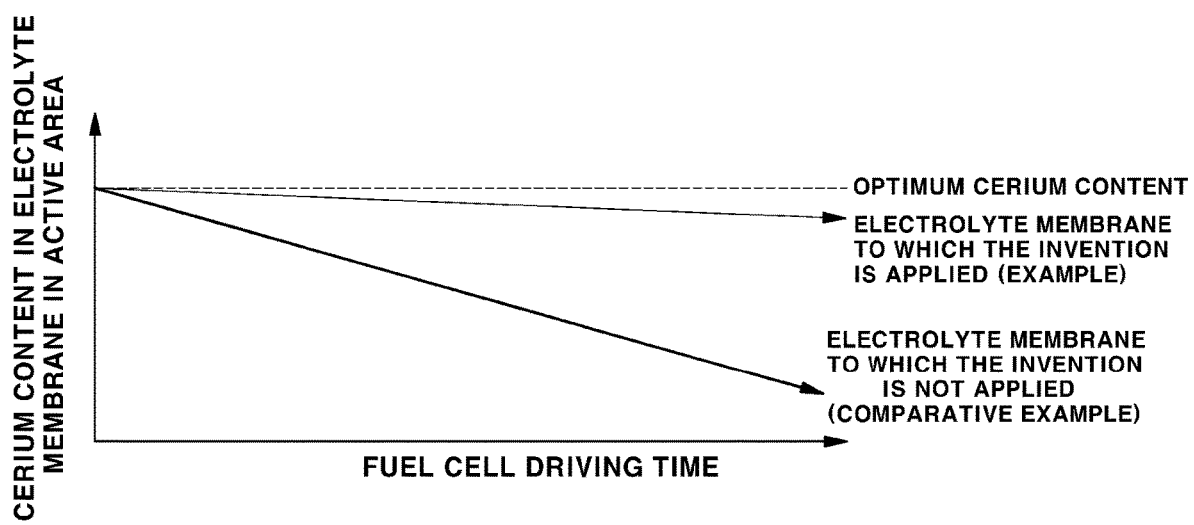
FIG. 15 is a graph representing degrees of performance of exemplary fuel cells predicted from results of evaluation example 1.

FIG. 15 is a graph representing degrees of performance of fuel cells predicted from results of evaluation example 1. Particularly, from results under the bonding conditions of evaluation example 1-3, it was confirmed that the sub-gasket including the adhesive layer may control an amount of cerium migrating from the inactive area to the active area. Therefore, as exemplarily shown in FIG. 15, an amount of cerium loss in the electrolyte membrane may be compensated for by the antioxidant in the adhesive layer in the inactive area, thus leading to enhancement in a chemical durability life of the electrolyte membrane of the fuel cell. When an amount of cerium migrating from the inactive area to the active area is increased, the durability life of the electrolyte membrane may be enhanced but the performance of the electrolyte membrane may be decreased. In addition, chemical durability of the electrolyte membrane as well as ease in handling of the membrane electrode assembly, which is a main function of the sub-gasket, may be enhanced by restricting a migration speed of cerium while maintaining the bonding state so as not to exceed an optimum cerium content which is set up at an initial stage.

Evaluation Example 2

Table 4 below represents evaluation results of increments of cerium in the active area and appearance characteristics of the sub-gasket according to formation temperatures (bonding temperatures) and formation pressures (bonding pressures) of the cerium ion migration control area in the membrane electrode assembly manufactured according to manufacturing example 2.

TABLE 4

| Classification | Antioxidant in adhesive layer | | Bonding of electrolyte membrane and sub-gasket | | Formation of cerium ion migration control area | | Increment of cerium in active area (after 120 hr.) | | | Appearance of bonding part of sub-gasket |
|---|---|---|---|---|---|---|---|---|---|---|
| | Kind | Content (ppm/dry weight of adhesive layer) | Bonding Temp. (°C.) | Bonding pressure (MPa) | Bonding Temp. (°C.) | Bonding pressure (MPa) | Cerium amount (before) (μg/cm$^2$) | Cerium amount (after) (μg/cm$^2$) | Increment (%) | |
| Example 1-1 | Ce(NO$_3$)$_3$ 6H$_2$O | 20,000 | 100 | 3.2 | — | — | 2.7 | 4.8 | 78 | Good |
| Example 4-1 | | | | | 150 | 6.4 | 2.4 | 3.2 | 33 | Good |
| Example 4-2 | | | | | 200 | 6.4 | 2.7 | 3.4 | 26 | Good |
| Example 4-3 | | | | | 250 | 6.4 | 2.7 | 3.2 | 19 | Good |
| Example 4-4 | | | | | 150 | 19.2 | 2.6 | 3.4 | 31 | Good |
| Example 4-5 | | | | | 150 | 38.4 | 2.5 | 3.3 | 32 | Good |

As results of bonding performed at a temperature of 150° C. to 250° C. to form the cerium ion migration control area, it may be confirmed that, as the bonding temperature was increased as in examples 4-1 to 4-3, the amount of cerium migrating to the active area was decreased. When the bonding pressure was increased from 6.4 MPa to 38.4 MPa, the increment in cerium cations was not insignificantly changed as in examples 4-4 and 4-5. Therefore, it may be understood that a proper formation temperature of the cerium ion migration control area may be about 150° C. to 250° C., which is greater than the bonding temperature of the sub-gasket and a proper formation pressure of the cerium ion migration control area may be about 5 MPa to about 40 Mpa, which is greater than the bonding pressure of the sub-gasket.

Figure 16:
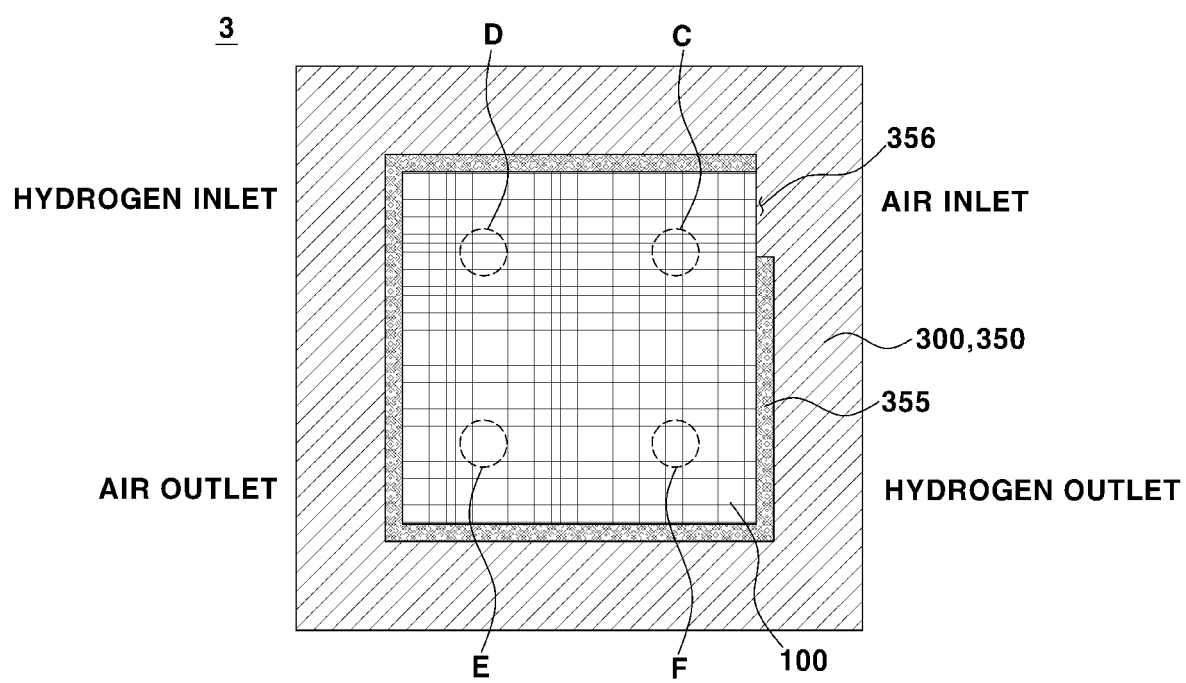
FIG. 16 is a plan view illustrating an exemplary membrane electrode assembly manufactured according to example 4-1 in evaluation example 2.

FIG. 16 is a plan view illustrating the membrane electrode assembly 3 manufactured according to example 4-1 in evaluation example 2. The results of example 4-1 according to positions in the electrolyte membrane 100 shown in FIG. 16 show that a change amount of cerium in a region C of the electrolyte membrane 100 adjacent to an air inlet, in which an opening 356 (no cerium ion migration control area) was formed, was greater than a change amount of cerium in other regions D, E and F by about 23%. It may be determined that there may be a greater difference in change amounts of cerium in a cell structure having a large active area. Further, it may be understood that the amount of cerium may be locally controlled through adjustment of the structure of the cerium ion migration control area 355.

As is apparent from the above description, a membrane electrode assembly according to several exemplary embodiments of the present invention may include an antioxidant in an adhesive layer and may thus stabilize peroxides generated at the position of the adhesive layer to enhance durability of the adhesive layer.

Further, even if in the related art, antioxidants in an electrolyte membrane and electrodes are discharged to the outside of a cell through dissolution and thus durability of the cell is reduced, the antioxidant including a metal salt hydrate according exemplary embodiments of the present invention, which may exist in the form of ions under an aqueous solution condition, may be used and migrate to the electrolyte membrane according to a driving time without influence on initial reduction in performance of the cell, thereby compensating for an amount of antioxidant loss, which may be caused by due to leakage to the outside of the cell, in the electrolyte membrane and the electrode and thus increasing chemical durability of the electrolyte membrane and the electrode.

Moreover, a cerium ion migration control area may be formed on the adhesive layer and may thus control and restrict a migration speed or a supply position of cerium cations supplied from the adhesive layer.

The invention has been described in detail with reference to preferred and exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A membrane electrode assembly, comprising:
   an electrolyte membrane;
   a sub-gasket formed in an edge region of the electrolyte membrane to surround a central region of the electrolyte membrane; and
   an adhesive layer formed between the electrolyte membrane and the sub-gasket and comprising an adhesive material and an antioxidant, wherein:
   the electrolyte membrane is formed to have a flat surface in a first direction,
   the sub-gasket extends in the first direction and a second direction that is vertical to the first direction, and
   the antioxidant comprises a metal salt hydrate, and
   the adhesive layer further comprises a cerium ion migration control area configured to surround at least a part of the central region of the electrolyte membrane.

2. The membrane electrode assembly of claim 1, wherein the sub-gasket protrudes in the second direction.

3. The membrane electrode assembly of claim 1, wherein the metal salt hydrate comprises one or more selected from the group consisting of a cerium salt hydrate, a cesium salt hydrate and a manganese salt hydrate.

4. The membrane electrode assembly of claim 3, wherein the cerium salt hydrate is ionized into trivalent cerium cations (Ce$^{3+}$) and a salt under an aqueous solution condition.

5. The membrane electrode assembly of claim 3, wherein the cerium salt hydrate comprises one or more selected from the group consisting of cerium nitrate hexahydrate (Ce(NO$_3$)$_3$ 6H$_2$O), cerium carbonate hydrate (Ce(CO$_3$)$_3$ H$_2$O), cerium chloride heptahydrate (CeCl$_3$ 7H$_2$O) and cerium sulfate octahydrate (Ce$_2$(SO$_4$)$_3$ 8H$_2$O).

6. The membrane electrode assembly of claim 1, wherein the adhesive layer comprises an amount of about 5,000 ppm to 200,000 ppm of the antioxidant per dry weight of the adhesive layer.

7. The membrane electrode assembly of claim 1, wherein the adhesive material comprises:

one or more selected from the group consisting of polyurethane, polyvinyl acetate, ethylene vinyl acetate, poly vinyl alcohol, poly vinyl ethylene, resorcinol-based resins, poly acrylic and poly vinyl ether; and a curing agent comprising one or more selected from the group consisting of peroxide-based, amine-based, aromatic-based, polyimide-based and isocyanate-based compounds.

8. The membrane electrode assembly of claim 1, wherein the sub-gasket comprises one or more selected from the group consisting of polyethylene terephthalate (PET), polyethylene naphthalate (PEN), polyimide (PI) and polypropylene (PP).

9. The membrane electrode assembly of claim 1, wherein the cerium ion migration control area comprises a cerium ion migration preventive surface facing the central region of the electrolyte membrane, and one or more openings formed in the cerium ion migration preventive surface.

10. The membrane electrode assembly of claim 9, wherein a region of the electrolyte membrane adjacent to the openings has a greater concentration of cerium cations than a region of the electrolyte membrane adjacent to the cerium ion migration preventive surface.

11. A manufacturing method of a membrane electrode assembly with a sub-gasket, comprising:
preparing an adhesive dispersion liquid comprising an adhesive material and an antioxidant comprising a metal salt hydrate;
forming an adhesive layer on the sub-gasket by coating a first surface of the sub-gasket with the adhesive dispersion liquid;
bonding the adhesive layer to an edge region of an electrolyte membrane to dispose the sub-gasket so as to surround a central region of the electrolyte membrane; and
forming a cerium ion migration control area by compressing on at least a part of the adhesive layer configured to surround at least a part of the central region of the electrolyte membrane.

12. The manufacturing method of claim 11, wherein the bonding the adhesive layer to the edge region of the electrolyte membrane is performed at a temperature of about 50° C. to 150° C.

13. The manufacturing method of claim 11, wherein the bonding the adhesive layer to the edge region of the electrolyte membrane is performed at a pressure of about 0.5 MPa to 10.0 MPa.

14. The manufacturing method of claim 11, wherein, in the preparing the adhesive dispersion liquid, the metal salt hydrate comprises a cerium salt hydrate.

15. The manufacturing method of claim 11, wherein the forming the cerium ion migration control area comprises:
forming a cerium ion migration preventive surface on the adhesive layer in the central region of the electrolyte membrane; and
forming one or more openings in at least some regions of the cerium ion migration preventive surface so as to cause cerium cations to migrate therethrough.

16. The manufacturing method of claim 11, wherein the forming the cerium ion migration control area is performed at a temperature of about 100° C. to 300° C.

17. The manufacturing method of claim 11, wherein the forming the cerium ion migration control area is performed at a pressure of about 3.2 MPa to 38.4 MPa.

18. The manufacturing method of claim 11, further comprising forming the electrolyte membrane, prior to the bonding the adhesive layer to the edge region of the electrolyte membrane,
wherein the forming the electrolyte membrane comprises:
preparing an admixture comprising an ionomer, a solvent and the antioxidant;
coating a release film with the admixture; and
forming the electrolyte membrane by performing drying and heat treatment of the coated admixture.

\* \* \* \* \*